United States Patent
Milby (10) Patent No.: US 9,594,527 B2
(45) Date of Patent: Mar. 14, 2017

(54) PRECEDENCE BASED STORAGE

(75) Inventor: Gregory Howard Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 737 days.

(21) Appl. No.: 12/639,456

(22) Filed: Dec. 16, 2009

(65) Prior Publication Data

US 2011/0145200 A1    Jun. 16, 2011

(51) Int. Cl.
*G06F 12/00* (2006.01)
*G06F 17/30* (2006.01)
*G06F 3/06* (2006.01)

(52) U.S. Cl.
CPC .......... *G06F 3/0689* (2013.01); *G06F 3/0622* (2013.01); *G06F 3/0631* (2013.01); *G06F 17/30221* (2013.01)

(58) Field of Classification Search
CPC ...... G06F 3/064; G06F 3/0608; G06F 3/0683; G06F 3/0637
See application file for complete search history.

(56) References Cited

U.S. PATENT DOCUMENTS

| | | | |
|---|---|---|---|
| 6,121,974 A | 9/2000 | Shaw | |
| 7,062,628 B2* | 6/2006 | Amano | 707/999.202 |
| 7,197,704 B1 | 3/2007 | Yahara | |
| 7,447,863 B2 | 11/2008 | Toume et al. | |
| 7,529,753 B1* | 5/2009 | Ewing | 707/999.004 |
| 7,584,229 B2 | 9/2009 | Moore et al. | |
| 7,584,340 B1* | 9/2009 | Colgrove | G06F 3/0608 360/48 |
| 7,630,369 B1 | 12/2009 | Overby et al. | |
| 7,673,096 B2* | 3/2010 | Aoyama | 711/112 |
| 7,844,833 B2* | 11/2010 | Snead | 713/193 |
| 2003/0154220 A1* | 8/2003 | Cannon | G06F 11/1451 |
| 2008/0049276 A1* | 2/2008 | Abe | 358/524 |
| 2008/0229045 A1* | 9/2008 | Qi | 711/170 |
| 2009/0119529 A1* | 5/2009 | Kono et al. | 713/324 |
| 2010/0082546 A1* | 4/2010 | Sreenivas et al. | 707/641 |

* cited by examiner

*Primary Examiner* — Jau-Shya Meng
(74) *Attorney, Agent, or Firm* — Schwegman, Lundberg & Woessner, P.A.

(57) ABSTRACT

Techniques for precedence based storage are presented. Storage for a database is organized into storage pools; collections of pools form storage classes. The storage pools within a particular class are organized in a precedence-based order so that when storage for the database is needed, the storage pools are used in the defined order of precedence. Additionally, each storage pool or storage class can be circumscribed by security limitations, quality of service limitations, and/or backup procedures.

6 Claims, 6 Drawing Sheets

PRECEDENCE BASED STORAGE

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described herein and below: Copyright © 2009, Teradata, Inc. of Miamisburg, Ohio—All Rights Reserved.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals.

The enterprise data can originate from a myriad of sources and even external feeds, but ultimately the goal for the enterprise is that all the data be consolidated, indexed, and related within a central enterprise data warehouse.

Over a few short years of gathering all this data, an enterprise can quickly realize that they have overwhelmed the existing storage capacity of their database. As a result, the enterprise may attempt to expand the storage, which in many cases can substantially slow the response times of the database. In other cases, the enterprise may try to upgrade to another database; but, this approach is even more problematic because a significant data port has to occur to make the existing data in the existing database compatible in the new database architecture.

In fact, most database architectures utilizes a homogeneous hardware architecture with respect to storage interconnects and storage devices. This may work well when most of the data being stored in the database maintains an equal weight in terms of importance to an enterprise and all the data has roughly the same performance throughput requirements.

However, in the ever evolving technology marketplace, data is acquired in a variety of different formats (video, image, text, audio, graphics, etc.) and available nearly instantaneously over the World-Wide Web (WWW). An enterprise typically also finds that some data needs to be more secure and accessed more readily than other types of data and that some data is frequently accessed but rarely changed. So, a stagnant and one-size fits all approach is no longer practicable for any competitive enterprise.

SUMMARY

In various embodiments, techniques for precedence-based storage are presented. According to an embodiment, a method for precedence-based storage is presented. Specifically, storage pools are identified for use in servicing storage needs of a database. Next, a precedence order is acquired for selecting particular ones of the storage pools in a defined order as storage is needed by the database

DETAILED DESCRIPTION

Figure 1:
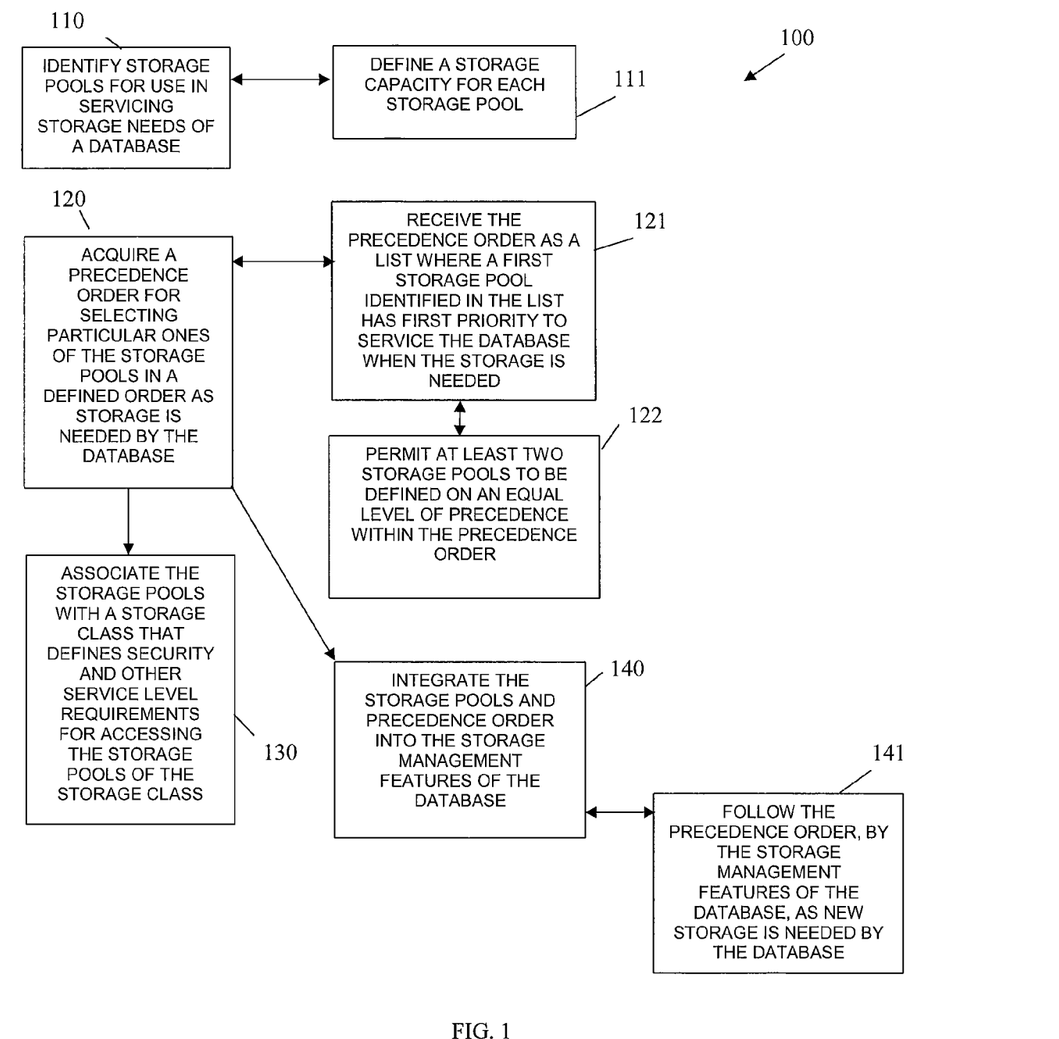
FIG. 1 is a diagram of a method for precedence-based storage, according to an example embodiment.

FIG. 1 is a diagram of a method 100 for precedence-based storage, according to an example embodiment. The method 100 (hereinafter "database storage service") is implemented in a machine-accessible or computer-readable storage medium as instructions that is executed by a machine (processing device (processor-enabled with memory; can also be a multiprocessor device) performs the processing depicted in FIG. 1. The machine specifically configured to process the database storage service. Moreover, the database storage service is optionally accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by Teradata, Inc. of Miamisburg, Ohio.

It is within this context that the processing associated with the database storage service is now described in detail with reference to the FIG. 1.

Embodiments of this invention utilize an arbitrary number of pre-named storage pools. Storage Pools are repositories containing the actual physical or logical storage devices used to store the data for the database (Database Table/Row data). The number and names of the storage pools can either be fixed, or optionally, one may start out with a fixed number of pools that may then be increased using the CREATE STORAGE POOL statement, introduced below with the illustrations that follow the discussion of the FIG. 3.

Whenever the database administrator (DBA) or systems administrator wishes to add logical or physical storage devices to the database system, they do so by adding those devices to a particular storage pool. This can be accomplished by utilizing the ADD STORAGE statement, also described below with the illustrations that follow the discussion of the FIG. 3.

In some embodiments, all physical and logical storage devices are considered to contain of a collection of fixed size storage units called cylinders. Storage pools are thus considered to be pools containing cylinders. So when a storage device containing X cylinders is added to the system, it means that X cylinders are added to a particular storage pool.

With some embodiments of this invention employ the concepts of creating various quality of service levels for storage. A modified version of the non-ANSI CREATE STORAGE CLASS statement is then employed to enable DBAs to define various quality of service levels, a.k.a., storage classes, for their database system. For techniques herein, however, the storage classes are defined with regards to a storage pool precedence list, which defines the pecking order by which storage pools are to provide storage classes with free (unallocated) database storage. For example, if a database system was predefined to have four storage pools named: A, B, C, and D; and, a storage class was defined with the precedence list: B, C, A. This means that whenever the database becomes full (due to database tables being created and rows being inserted into those tables) that request for new cylinders for the database will first be directed toward Storage Pool "B," followed by Storage Pool "C," followed by Storage Pool "A." Cylinders are NEVER to be requested from Storage Pool "D."

This techniques presented herein include a mechanism by which individual storage pools in the precedence list may be declared to be higher, lower or at the same level as other storage pools referenced in the list.

Once the storage classes have been defined, the techniques presented enable particular storage classes to be associated with databases, users, permanent tables, Large Object (LOB) columns, temporary tables, intermediate result spool files, as well as Teradata® (in some embodiments) specific database entities: permanent journals and fallback protection. It is this association that provides the database system with the final information that it requires in order to match up the database data with the desired storage type (desired quality of service level for that database component).

It is within this context that the processing of the database storage service is now discussed with reference to the FIG. 1.

At 110, the database storage service identifies storage pools for use in servicing storage needs of a database. The storage pools themselves can be configured and logically assembled from multiple disparate types of storage to form a pool of storage. This can occur when a storage pool is created as described below with the examples that follow the discussion of the FIG. 3.

According to an embodiment, at 111, the database storage service defines a storage capacity for each storage pools. So, as an example, one storage pool may be defined with 10 GB's of storage capacity whereas another storage pool may be defined with 100 GB's of storage capacity. Again, the command for achieving this and some examples are presented below after the discussion of the FIG. 3.

At 120, the database storage service acquires a precedence order for selecting particular ones of the storage pools in a defined order as storage is needed by the database.

In an embodiment, at 121, the database storage service receives the precedence order as a list where a first storage pool indentified in the list has a first priority to service the database when storage is needed.

Continuing with the embodiment of 121 and at 122, the database storage service permits at least two storage pools to be defined on an equal level of precedence within the precedence order. So, two or even more than two, such as three or more, can be used at the same precedence level when storage is needed by the database. Examples of this are also provided below with reference to the discussion that follows the FIG. 3.

It is also noted that the precedence order can also be implemented as any data structure, such as a table, and the order used as an index into the table to acquire the pools in the proper precedence order.

According to an embodiment, at 130, the database storage service associates the storage pools with a storage class. That is, the storage class is a mechanism to reference the storage pools as a single unit. The storage class can have custom security and other service level requirements for accessing the storage pools of the storage class. This too is described in greater detail below with reference to the discussion that follows the FIG. 3. It is noted that the custom security and service level requirements can be levied against all storage pools via the storage class or via just selective ones of the storage pools that exist within the storage class.

In another case, at 140, the database storage service integrates the storage pools and precedence order into the storage management features of the database. In other words, the database storage service interacts with the storage facilities of the database to provide the storage pools and storage classes as defined herein.

Continuing with the embodiment of 140 and at 141, the database storage service follows the precedence order via the storage management features of the database as new storage is needed by the database. That is, the storage management features utilize the database storage service to acquire storage when storage is needed and the database storage service follows the precedence order for acquiring available storage pools.

Figure 2:
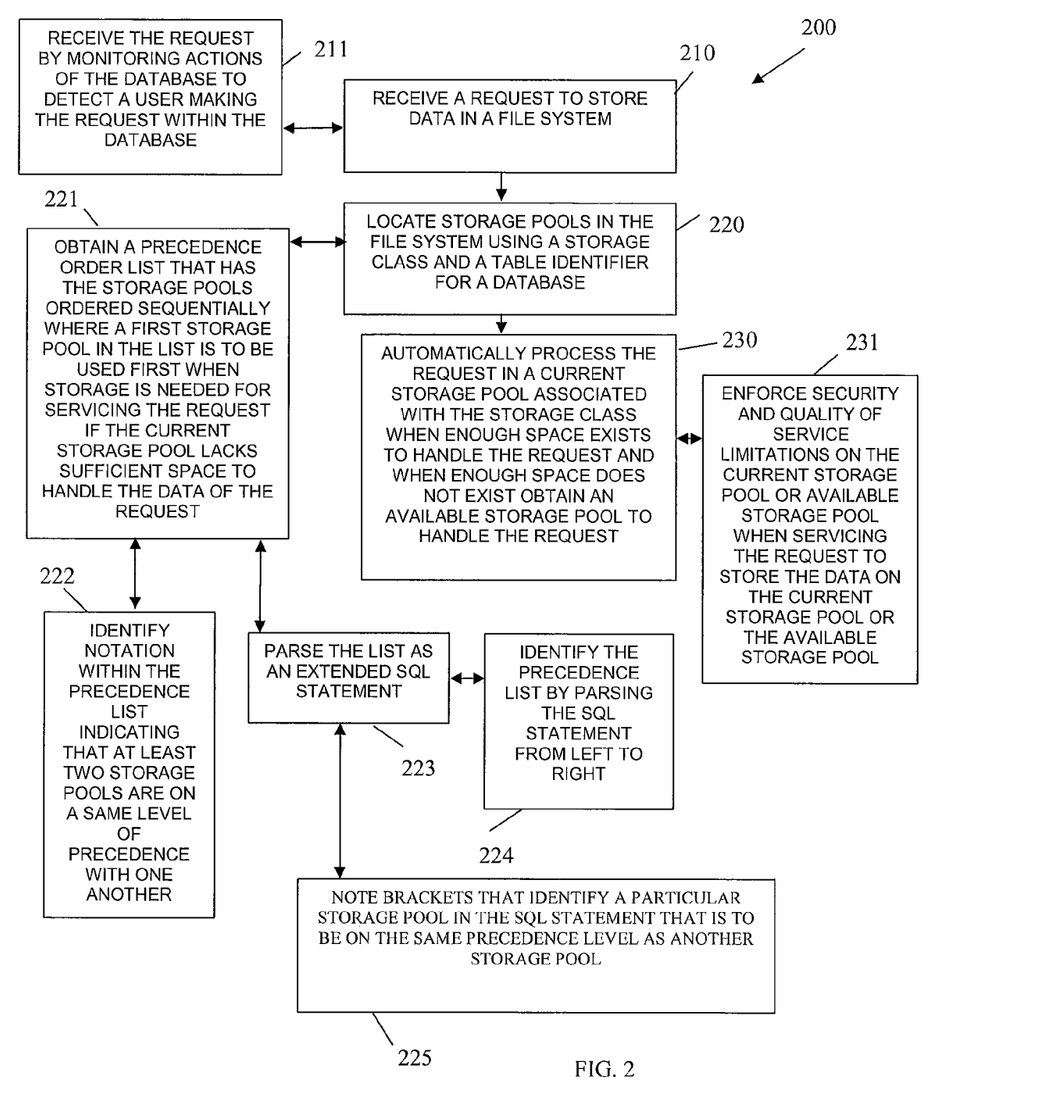
FIG. 2 is a diagram of another method for precedence-based storage, according to an example embodiment.

FIG. 2 is a diagram of another method 200 for precedence-based storage, according to an example embodiment. The method 200 (hereinafter "precedence-based storage service") is implemented in a machine-accessible or a computer-readable storage medium as instructions that are executed by a machine (one or more processors) and perform the processing reflected in FIG. 2. Again, the machine is specifically configured to process the precedence-based storage service. The precedence-based storage service may also be accessible over a network. The network may be wired, wireless, or a combination of wired and wireless.

The precedence-based storage service presents an alternative and in some cases an enhanced processing perspective to the database storage service represented by the method 100 of the FIG. 1. Specifically, the database storage service is focused on the initial creation of precedence-based storage configuration for a database. The precedence-based storage service is focused on handling database requests that then utilize the precedence-based storage configuration established by the database storage service represented as the method 100 and described above with respect to the FIG. 1.

At 210, the precedence-based storage service receives a request to store data in a file system. This request can be received via a user or via an automated application processing on behalf of the user against a database.

According to an embodiment, at 211, the precedence-based storage service receives the request by monitoring actions of the database to detect that a user or an automated application making the request to store the data within the database.

At 220, the precedence-based storage service locates storage pools in the file system using a storage class (via storage class identifier) and a table identifier for a database.

In an embodiment, at 221, the precedence-based storage service obtains a precedence ordered list that has the storage pools ordered sequentially. The first storage pool in the list is to be used first when storage is needed for servicing the request if the current storage pool lacks sufficient space to handle the data of the request.

Continuing with the embodiment of 221 and at 222, the precedence-based storage service identifies notation within the precedence list indicating that at least two or more storage pools are on a same level of precedence with one another. Here, any storage pool on the same precedence level can be used. In some cases, such a pool is selected based on performance considerations, such as when two pools are of equal weight but the user or application storing data is physically closer to one of the two available pools. Policy can be evaluated to select which pool to use when two or more pools are of equal weight.

Continuing with the embodiment of 222 and at 223, the precedence-based storage service parses the list as an extended Structured Query Language (SQL) statement. That is, SQL is extended to provide operations that permit the precedence list to be defined and processed. Further extensions to the SQL are provided below with some example illustrations.

Continuing with the embodiment of 223 and at 224, the precedence-based storage service identifies the precedence list by parsing the SQL statement from let to right.

Still further at 225, the precedence-based storage service notes brackets in the SQL statement to identify a particular storage pool that is on the same level of precedence as another storage pool. Example syntax of such extended SQL statements are provided herein and below in greater detail.

At 230, the precedence-based storage service automatically processes the request using a current storage pool associated with the storage class when enough space exists in that current storage pool to handle the data request. However, when enough space does not exist to handle the data, then an available storage pool is used to handle the request selected from the precedence order associated with the storage pools.

According to an embodiment, at 231, the precedence-based storage service enforces security and quality of service limitations or requirements on the current storage pool or the available storage pool when servicing the data request to store the data on the current or the available storage pool.

Figure 3:
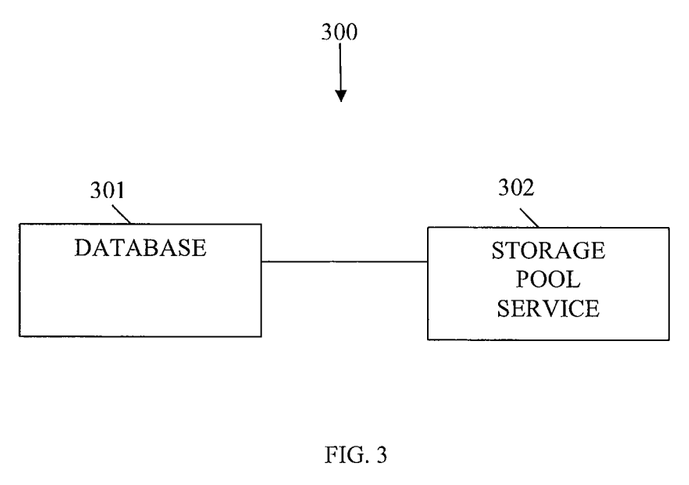
FIG. 3 is a diagram of a precedence-based storage system, according to an example embodiment.

FIG. 3 is a diagram of a precedence-based storage system 300, according to an example embodiment. The precedence-based storage system 300 is implemented in a machine-accessible and/or computer-readable storage medium that is executed by one or more processors and is operational over a network. The network may be wired, wireless, or a combination of wired and wireless.

In an embodiment, portions of the precedence-based storage system 300 implements, among other things the database storage service and the precedence-based storage service represented by the methods 100 and 200 of the FIGS. 1 and 2, respectively.

The precedence-based storage system 300 includes a database 301 and a storage pool service 302. Each of these and their interactions with one another will now be discussed in turn.

The database 301 is implemented in a computer-readable storage medium and is to execute on one or more processors of a network. Example aspects of the database 301 were presented above with reference to the methods 100 and 200 of the FIGS. 1 and 2, respectively.

The database 301 is configured to include storage pools defined as collections within custom storage classes. Each storage class or each storage pool within a particular storage class can have its own custom security, backup mechanisms, and/or quality of service requirements.

The database 301 is configured to interact with storage pool service 302.

The storage pool service 302 is implemented in a computer-readable storage medium and is to execute on one or more processors of the network. Example processing associated with the storage pool service 302 was presented in detail above with reference to the methods 100 and 200 of the FIGS. 1 and 2, respectively.

The storage pool service 302 is configured to define and manage the storage pools defined for the database 301. The storage pools are distributed over a file system and/or network and the storage pools are managed by the storage pool service 302.

Additionally, the storage pool service 302 is configured to define collections of the storage pools as a storage class and to order the storage pools in a precedence use order.

The storage pool service 302 is also configured to handle storage access to the database 301.

According to an embodiment, the storage pool service 302 is configured to maintain the precedence of user order as a list having identifiers for each of the storage pools.

Continuing with the latter embodiment, the storage pool service 302 is also configured to permit two or more storage pools to be on a same or equal level of precedence within the list.

In another scenario, the storage pool service 302 is configured to selectively enforce security and quality of service requirements against each of the storage pools in the storage class. Some examples of this and some example software code to implement this are presented below following the discussion of the FIG. 3.

In an embodiment, the storage pool service 302 is configured to selectively enforce security backup services against each of the storage pools in the storage class. Again, some examples of this and some example software code to implement this are presented below following the discussion of the FIG. 3.

Now some example illustrations and implementations are provided for purposes of improving the comprehension of the teachings presented herein. Other implementations can be achieved without departing from the teachings.

The optional SQL-like commands can be integrated into existing vendor Storage Management utilities to enable the creation of Storage Pools. Note: This can be implemented as either a SQL Data Definition Language (DDL) Statement, Storage Management Utility command, or both. Also, implementation is optional because the DBS vendor may opt to implement a fixed number of pre-named pools, circumventing the need for this command.

CREATE STORAGE POOL <storage pool name> <semi-colon>

Once a storage pool has been declared, the commands that follow can be utilized to register the storage devices being added to the system:

---

ADD STORAGE <storage pool name> <storage size> TO SYSTEM <semi-colon>
And/Or
ADD STORAGE <storage pool name> <storage size> TO CLIQUE <semi-colon>

---

Some examples of using these SQL-like statements follow:

---

CREATE STORAGE POOL MaidPool;
CREATE STORAGE POOL NormA ;
CREATE STORAGE POOL NormB ;
CREATE STORAGE POOL VeryProtectedA;
CREATE STORAGE POOL VeryProtectedB;
ADD STORAGE NormA 20 GB TO SYSTEM;
ADD STORAGE NormB 40 GB TO SYSTEM;
ADD STORAGE VeryProtectedA 100 GB TO SYSTEM;

```
    ADD STORAGE VeryProtectedB 40 GB TO SYSTEM;
    ADD STORAGE MaidPool 200 GB TO SYSTEM;
         © Teradata Corp, Miamisburg, Ohio 2009
```

The non-ANSI SQL statement for creating storage classes is described below:

```
    CREATE STORAGE CLASS <storage class name> <storage
pool precedence clause>
         <storage class name> ::= teradata identifier - up to a 30 byte long
character string.
         <storage pool precedence clause> ::= WITH STORAGE
PRECEDENCE LIST
         <left parenthesis>
              < storage pool precedence list>
         <right parenthesis>
         < storage pool precedence list > ::=
                   < storage pool precedence element> [... <comma> <
storage pool precedence element> ]
         < storage pool precedence element> ::=
         { <storage pool name>
                   | <storage pool name> <left square bracket>
         <storage pool name> <right square bracket> }
              © Teradata Corp, Miamisburg, Ohio 2009
```

The order in which the names of storage pools appear in the list provide their precedence. The list is ordered from highest to lowest, where being the highest means that this is the first storage pool from which cylinders should be drawn. If a storage pool is not mentioned in the list, then cylinders cannot be drawn from that pool. Note that a <storage pool precedence element> can be of the form, "<storage pool name>", or "<storage pool name>[<storage pool name>]". The second form means that the storage pool that is named outside of the brackets ("[ ]") is at the same level as the storage pool named inside the brackets. This of course means that the storage pool named within the brackets must be present in the precedence list, or an error condition, "Improper precedence list", will be returned to the user.

Some examples of using this SQL, follow:

```
    CREATE STORAGE CLASS NormStorage
    WITH STORAGE PRECEDENCE LIST (NormA, NormB);
    CREATE STORAGE CLASS VeryProtectedAndExpensive
         WITH STORAGE PRECEDENCE LIST (VeryProtectedA,
    VeryProtectedB[VeryProtectedA] );
    CREATE STORAGE CLASS TransientResearchStorage
         WITH STORAGE PRECEDENCE LIST (MaidPool,
NormB);
         © Teradata Corp, Miamisburg, Ohio 2009
```

In the first example: the highest precedence storage pool is "NormA", followed by "NormB". Thus cylinders are first drawn from "NormA," and then "NormB."

In the second example: the highest precedence storage pool is "VeryProtectedA." Storage pool "VeryProtectedB" is declared to be at the same precedence level as Storage Pool "VeryProtectedA." Thus cylinders can be drawn from either "VeryProtectedA" or "VeryProtectedB."

Enhanced Existing ANSI SQL Statements:

The remaining embodiments described utilize the same enhanced SQL statements.

Existing ANSI SQL can be enhanced to enable various database components: databases, users, permanent tables, LOB columns, temporary tables, intermediate result spool files, as well as Teradata® specific database entities: permanent journals and fallback protection; to be associated with a particular storage class (quality of service level).

GRANT/REVOKE: Storage classes, once created can be treated as true database objects that can then be worked into the database GRANT/REVOKE model. The SQL to accomplish this is provided below:

```
    GRANT <privileges options> ON <object name> TO <grantee> [ {
         <comma> <grantee> }... ]
              [ WITH GRANT OPTION]
    REVOKE [ GRANT OPTION FOR ] privileges options> ON <object
name> { TO \ FROM } <grantee>
    <privileges options > ::= { ALL [ PRIVILEGES ]}
              | { ALL BUT <operation list> }   | <operation list>
    <operation list> ::= <privileges> [ <optional grant column list> ]
    <privileges> ::=
         {          STORAGEUSAGE | STORAGECREATE
                   | !! All existing V2R6.2 alternatives
         }
    <optional grant column list> ::= !! Existing syntax options
    <object name> ::= <V2R6.2 object> | { STORAGE CLASS <storage
    class object> }
    <V2R6.2 object> ::= !! Existing syntax options
    <storage class object> ::= <storage class name>
    <grantee> ::= !! All existing V2R6.2 alternatives
              © Teradata Corp, Miamisburg, Ohio 2009
```

The GRANT model provides two privilege levels: STORAGEUSAGE and STORAGECREATE. The STORAGECREATE is used by the DBA to grant the privilege of being able to issue CREATE STORAGE CLASS and DROP STORAGE CLASS statements. The STORAGEUSAGE privilege is used by the DBA to grant usage of a particular storage class.

The <storage class clause>, IN STORAGE <storage class name>, is used in the CREATE USER, CREATE DATABASE, and CREATE TABLE SQL to associate a particular storage class with a database, user, entire table (plus all of its subcomponents), individual LOB or LOB User Defined Table (UDT) columns, permanent journal tables, fallback protection, temporary tables, or spool files (intermediate result tables).

```
    <storage class clause> ::= IN STORAGE <storage class name>
         © Teradata Corp, Miamisburg, Ohio 2009
```

Resolving the storage class to be associated with a particular table, table column, or table sub-component. Embodiments of this invention include a mechanism by which a simple three level hierarchy is established that can be used to determine what storage class is to be associated with a particular table, table column, or table subcomponent (e.g., Teradata® permanent journal or Teradata® fallback protection).

Level 1: Every database system has a default SYSTEMSTORAGE storage class defined for it. This is defined by either issuing a CREATE STORAGE CLASS statement or by setting DBS Control parameters (Teradata approach). This storage class is associated with every table, table column, table subcomponent that does not have a Level 2 or Level 3 IN STORAGE CLASS associated with it.

Level 2: If the database/user in which the table, tablecolumn, or table subcomponent exists was created with the storage class clause and the table, table column, table subcomponent that does not have a Level 2 or Level 3 IN STORAGE CLASS associated with it, then the database/user level storage class definition is applied to the table, table-column, or table subcomponent.

Level 3: If a table, table-column, or table subcomponent was declared with a storage class clause, then that storage class is associated with the table, LOB table column, or table subcomponent.

CREATE USER: The enhanced SQL for associating a storage class with a database user is provided below:

The <storage class clause> is used to perform the association. By applying the association to the AS PERMANENT clause, it is associated with all permanent space in the database. The phrase "associating with SPOOL" means that all transient/intermediate/scratch tables are associated with the specified storage class. Associating with TEMPORARY means that all created Temporary Tables is associated with the specified storage class.

```
CREATE USER <user name>
[FROM <database name>]
    AS PERMANENT <equals> <number bytes> <storage class
clause> <comma>
    PASSWORD = <password> <comma>
    DEFAULT DATABASE NAME <equals> <database name>
<comma>
    SPOOL <equals> <number bytes> <storage class clause>
<comma>
    TEMPORARY <equals> <number bytes> <storage class clause>
<comma>
    FALLBACK [PROTECTION] <storage class clause> <comma>
    DEFAULT JOURNAL TABLE <equals>
        <database name> <period> <table name> <storage
    class clause> <semi-colon>
    <storage class clause> ::= IN STORAGE <storage class name>
        © Teradata Corp, Miamisburg, Ohio 2009
```

CREATE DATABASE: The enhanced SQL for associating a storage class with a database is provided below:

The <storage class clause> is used to perform the association. By applying the association to the AS PERMANENT clause, it is associated with all permanent space in the database. The phrase "associating with SPOOL" means that all transient/intermediate/scratch tables are associated with the specified storage class. The phrase "associating with TEMPORARY" means that all created Temporary Tables are associated with the specified storage class.

```
<create database> ::=
CREATE DATABASE <database name> [FROM <database
name>]
    AS PERMANENT <equals> <number bytes> <storage class
    clause> <comma>
    SPOOL <equals> <number bytes> <storage class clause>
<comma>
    TEMPORARY <equals> <number bytes> <storage class
    clause> <comma>
    FALLBACK [PROTECTION] <storage class clause>
<comma>
    DEFAULT JOURNAL TABLE <equals>
        <database name> <period> <table name> <storage
class clause> <semi-colon>
    © Teradata Corp, Miamisburg, Ohio 2009
```

The enhanced SQL for associating a storage class with either a Table, Permanent Journal, and/or LOB/LOB-UDT column is provided below:

```
<create table> ::=
CREATE <table kind> TABLE <table name> <table options> <left
paren> <column definitions>
<table level definitions> <right paren>
    [ <as clause> ] [ <commit options> ]
```

```
<table options> ::=
[ <comma> <storage class clause>
[ <comma> FALLBACK [PROTECTION] <storage class clause>
]
[ <comma> WITH JOURNAL TABLE <equals> [ <database
name> ] <period> <table name> <storage class clause> ] ]
    <lob column definitions> ::= <lob column definition> [ { <comma>
< lob column definition> } ... ]
    <lob column definition> ::= { <lob predef type column definition> |
<lob udt column definition> } <storage class clause>
    <storage class clause> ::= IN STORAGE <storage class name>
        © Teradata Corp, Miamisburg, Ohio 2009
```

The <storage class clause> is used to accomplish the association. In the SQL provided, the storage class clause is used to associate a storage class with an entire table (and all of its sub-components), or individual LOB columns, individual LOB-UDT columns, or be associated with Teradata® (as one example) ANSI enhancements such as the permanent journal table, or the table's fallback protection.

The embodiments presented herein and above support the ability for Database Administrators (DBAs) to create quality of service levels, called storage classes, for their database system.

The embodiments presented herein and above support ability for systems engineer to create storage pools for their database system.

The embodiments presented herein and above provide a mechanism by which storage classes are defined based on a storage pool precedence list.

The embodiments presented herein and above provide a mechanism by which a storage pool precedence list is defined and individual storage pools is declared to be either at a higher, lower, or equivalent precedence level than the other storage pools referenced in the list.

The embodiments presented herein and above provide a mechanism by which quality of storage classes is associated with database components: databases, users, permanent tables, temporary tables, intermediate tables, LOB/LOB-UDT columns, permanent journals, and fallback storage.

The embodiments presented herein and above provide a database GRANT/REVOKE permissions model that is built around storage classes.

Figure 4:
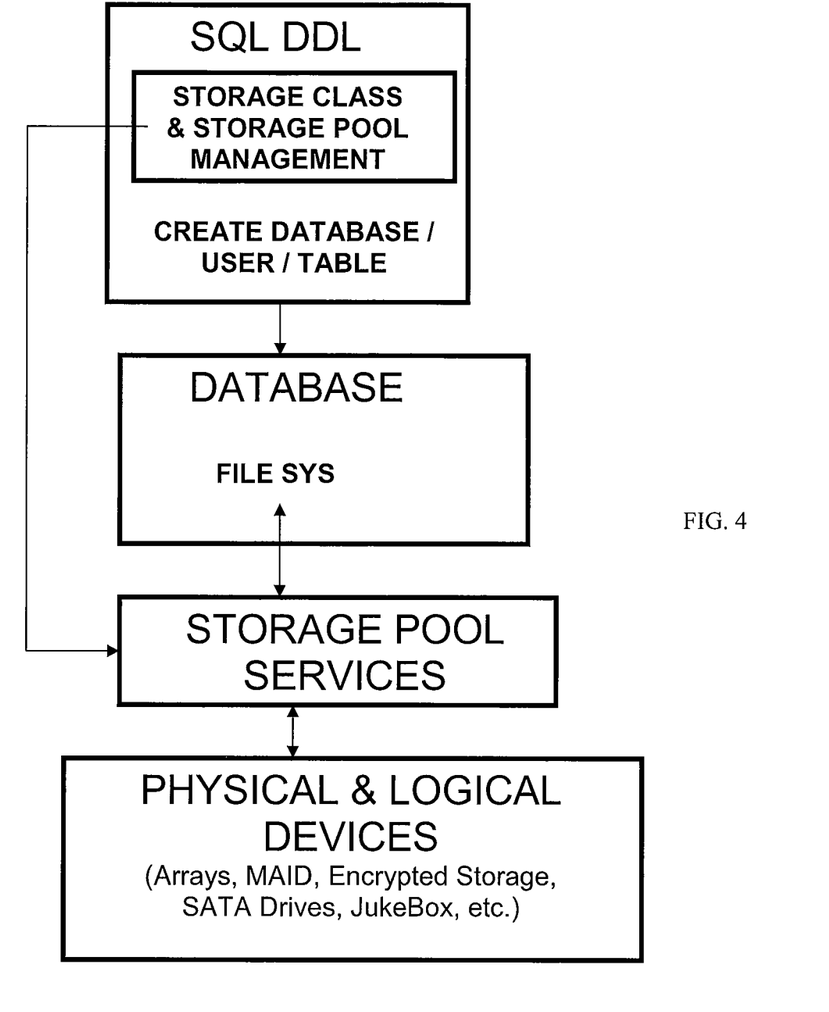
FIG. 4 is a diagram of a sample architecture for a precedence-based storage system, according to an example embodiment.

FIG. 4 is a diagram of a sample architecture for a precedence-based storage system, according to an example embodiment.

The lowest level is the physical storage from which pools are constructed. Next, storage pool services are identified and on top of that are the file system and database level of the architecture. The top level is the SQL interface level.

Figure 5:
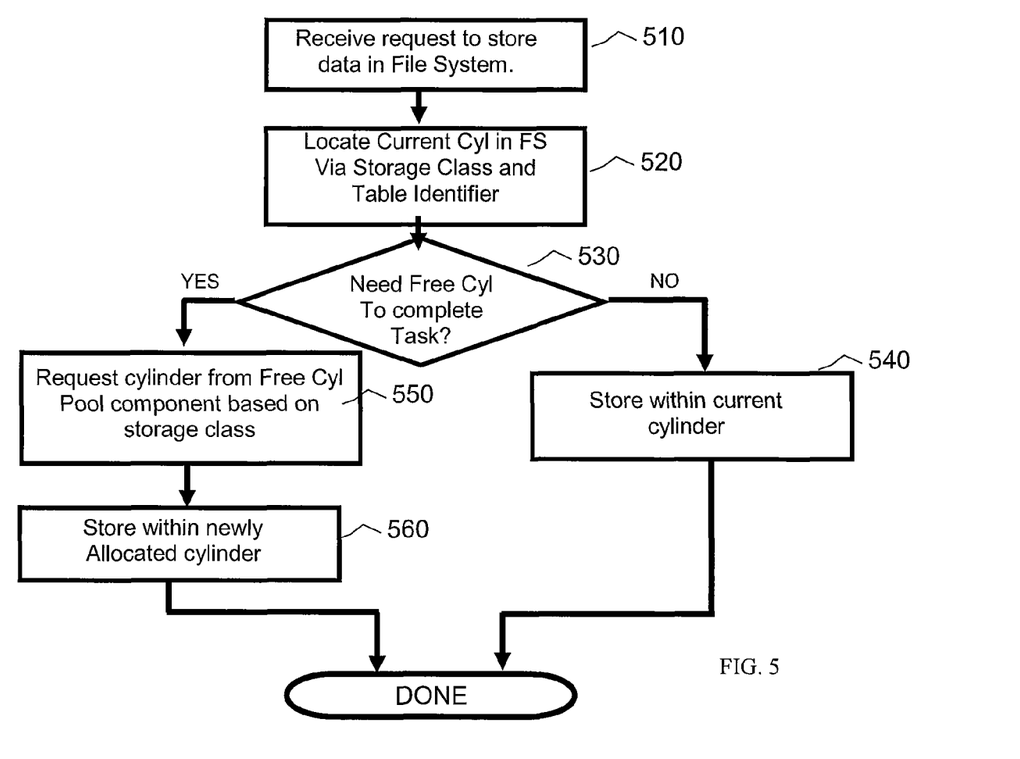
FIG. 5 is a diagram of sample processing flow for precedence-based storage, according to an example embodiment.

FIG. 5 is a diagram of sample processing flow for precedence-based storage, according to an example embodiment. The processing is implemented as instructions that reside in a computer-readable storage medium and that are processed on one or more processors of a network.

At 510, a request is received to store some piece of data in the file system. At 520, a current cylinder is identified via a storage class identifier and table identifier. At 530, a check is made to see if a free cylinder is needed to complete the request. Assuming a free cylinder is not needed, at 540, the data is stored in the current cylinder and processing completes. If a new cylinder is needed, then, at 550, the free cylinder is requested from the free cylinder pool, and at 560 the data is stored in the new cylinder. The processing at 550 is expanded upon in the FIG. 6 discussed below.

Figure 6:
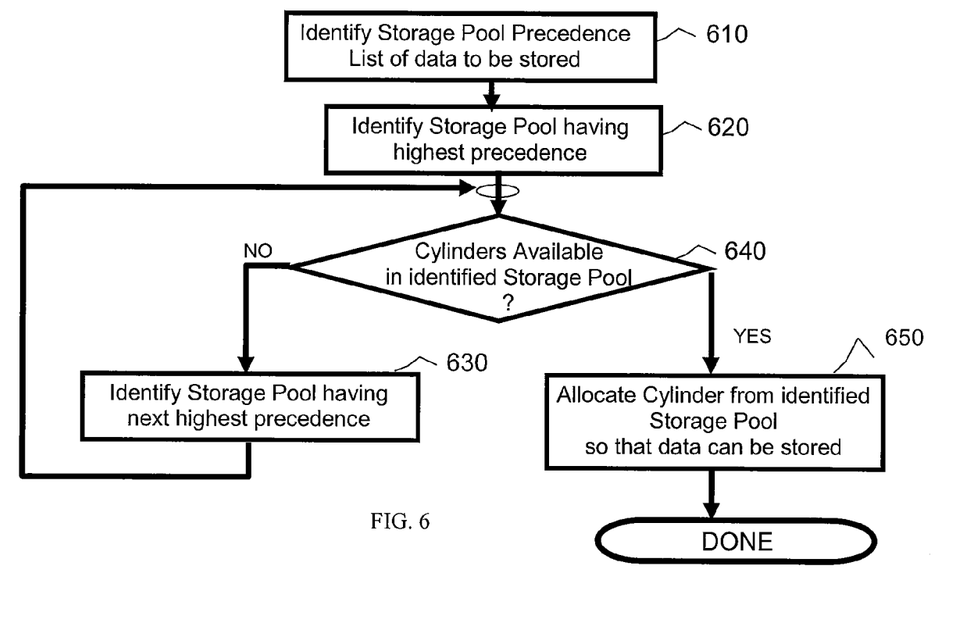
FIG. 6 is a diagram of another sample processing flow for precedence-based storage, according to an example embodiment.

FIG. 6 is a diagram of another sample processing flow for precedence-based storage, according to an example embodiment. Again, the processing is implemented as instructions in a computer-readable storage medium and is executed by one or more processors of a network.

The processing of the FIG. 6 expands upon the processing used to achieve 550 as identified in the FIG. 5 above. The processing of the FIG. 6 is used to select a cylinder.

Specifically, at 610, a storage pool precedence list is obtained. At 620, the storage pool with the highest precedence is identified from the list. At 630, each storage pool and its precedence within the list are established. At 640, a check is made to make sure that storage is available in the pool having the current highest precedence. At 650, any cylinder that needs allocated from the pool is allocated as needed.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method for precedence-based storage, the method implemented as executable instructions residing in a non-transitory computer-readable storage medium and executed by a hardware processor, the method comprising:

associating, by the hardware processing device, storage classes to storage pools within a database;

defining, via the hardware processor, storage pool precedence list for said storage pools, said storage pool precedence list specifying a predefined pecking order for using the storage pools, said storage pool precedence list including at least some storage pools within the predefined pecking order as higher, lower, or at a same level as other ones of the storage pools;

associating, via the hardware processor, said storage classes to database tables within said database;

receiving, via the hardware processor, a request to store data in a database table during operation of the database;

identifying, via the hardware processor, in response to said request, a subset of the storage pools using the storage class associated with said database table; and automatically processing, via the hardware processor: i) the request in a current storage pool in the subset of the storage pools identified for the storage class indicating that enough space exists to handle the request and ii) obtaining an available storage pool from the subset of the storage pools identified for the storage class for handling the request indicating that enough space for handling the request does not exist.

2. The method of claim 1, wherein receiving further includes receiving the request by monitoring actions of the database to detect a user making the request within the database.

3. The method of claim 2, wherein obtaining further includes parsing the precedence list as an extended Structured Query Language (SQL) statement.

4. The method of claim 3, wherein parsing further includes identifying precedence by parsing the SQL statement from left to right.

5. The method of claim 3, wherein parsing further includes noting brackets that identify a particular storage pool in the SQL statement, the particular storage pool is that is to be on a same precedence level as another storage pool.

6. The method of claim 1, wherein automatically processing further includes enforcing security and quality of service limitations on the current storage pool or available storage pool for servicing the request to store the data on the current storage pool or the available storage pool.

* * * * *